INVENTOR
ROBERT R. HODGSON
BY Louis C. Smith
ATTORNEY

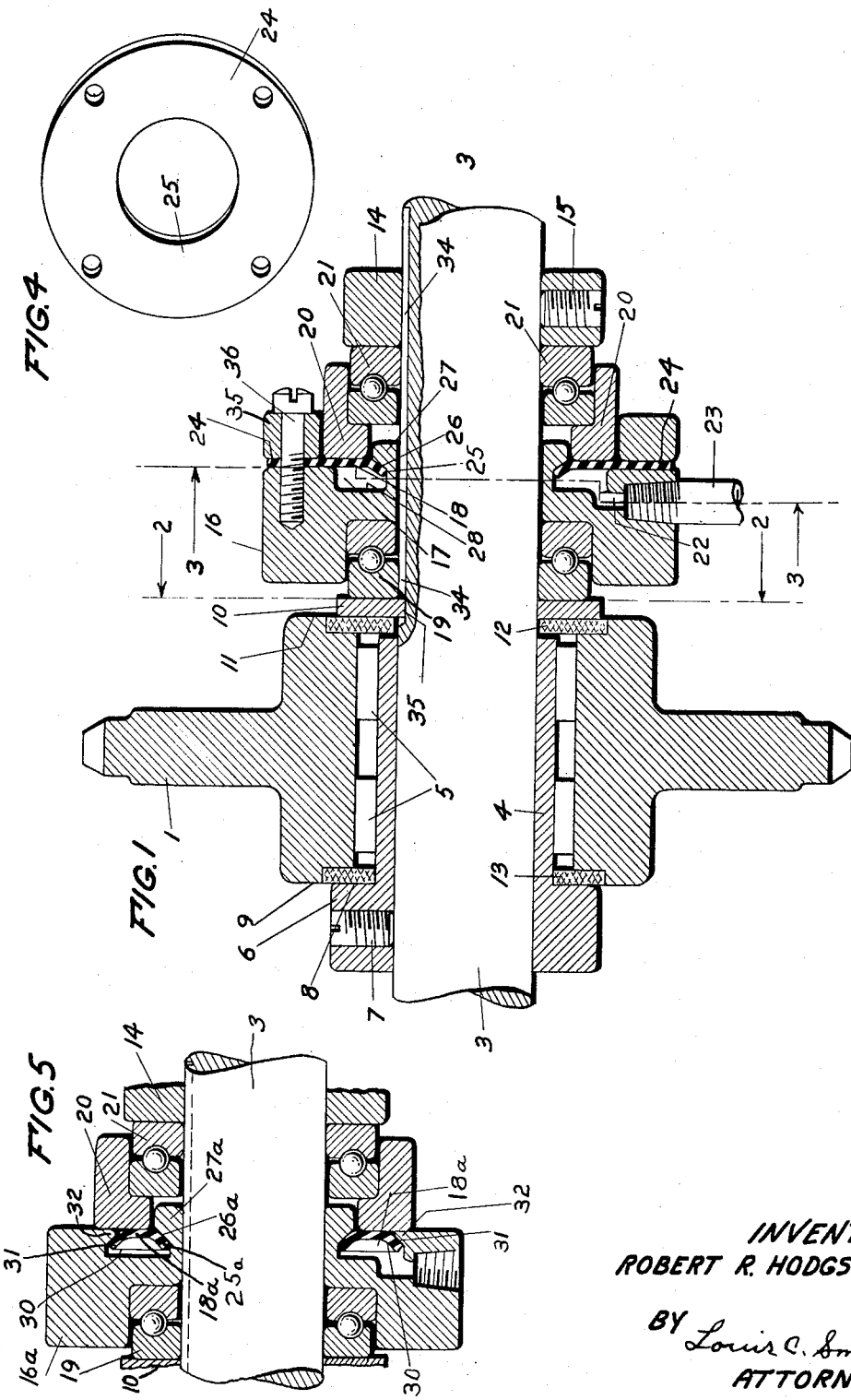

United States Patent Office 2,758,572
Patented Aug. 14, 1956

2,758,572

VARIABLE FRICTION TORQUE TRANSMISSION MECHANISM

Robert R. Hodgson, Quincy, Mass.

Application August 24, 1953, Serial No. 376,201

2 Claims. (Cl. 121—48)

This invention relates to a variable friction torque transmission mechanism by which torque is transmitted to a rotary driven member from a driving member which may or may not be rotating at a constant speed.

One object of the invention is to provide novel means for varying the amount of torque transmitted from the driving member to the driven member and thereby controlling the rotary motion of the driven member relative to that of the driving member.

A device embodying this invention has a wide variety of uses, one of which may be in connection with cloth feeding means including feeding rolls over which the cloth passes and by which it is fed forward. When used in this way the device may operate to vary and control the torque delivered to the feed rolls so as to establish a feeding movement of the cloth which will maintain it under a substantially uniform tension.

In the drawings, wherein I have illustrated a selected embodiment of the invention:

Fig. 1 is a sectional view of a device embodying the invention.

Fig. 4 is a view of the flexible gasket or washer which forms the flexible side wall of the fluid containing chamber.

Fig. 5 is a partial sectional view similar to Fig. 1 but showing a different embodiment of the invention.

Figure 3:
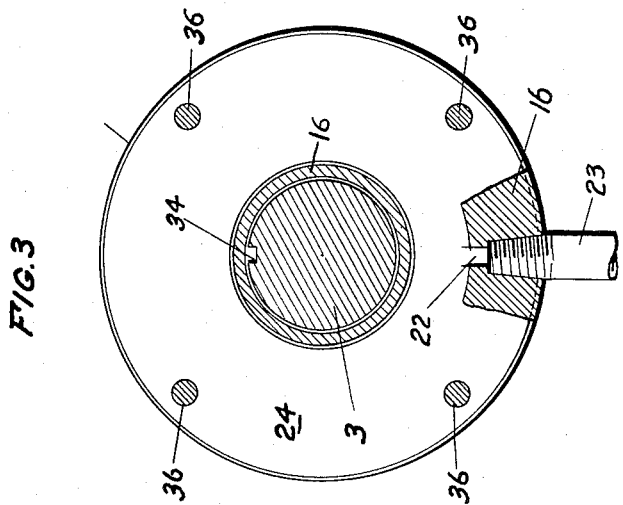
Fig. 3 is a section on the line 3—3, Fig. 1.
Figure 2:
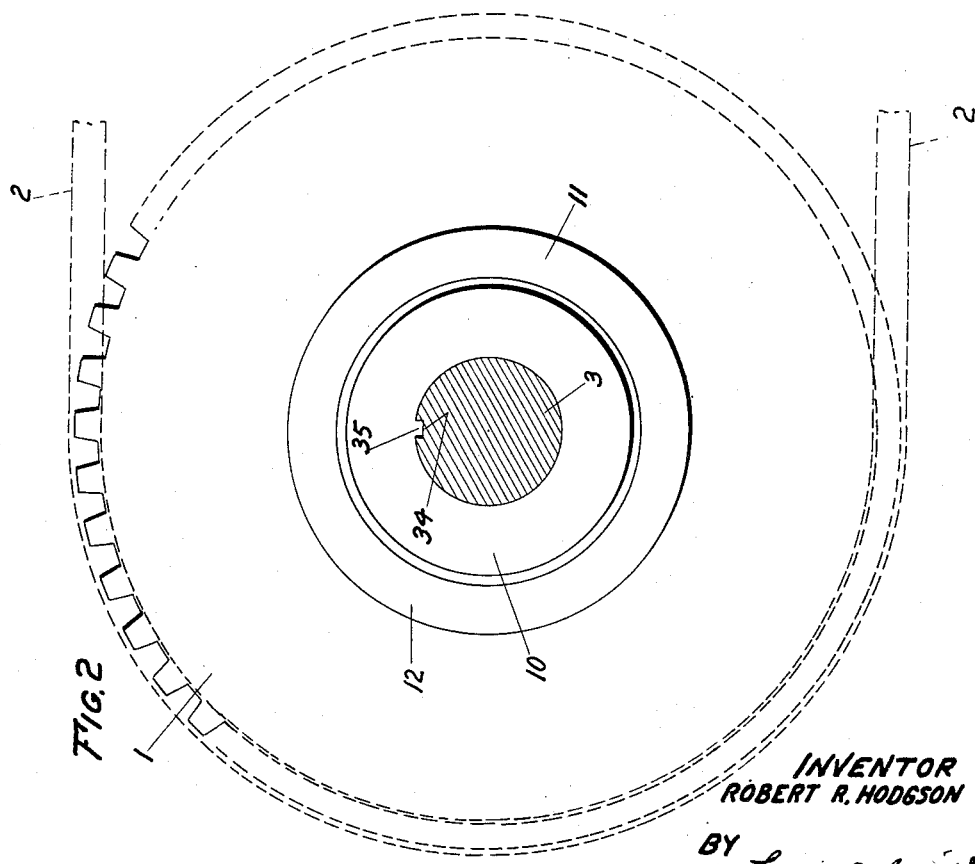
Fig. 2 is a section on the line 2—2, Fig. 1.

In the drawings, the rotary driving member is shown as a sprocket wheel 1 which is driven from a sprocket chain 2, and said sprocket chain may or may not be driven at a constant speed. The sprocket wheel or driving member is rotatably mounted upon a shaft 3 which constitutes the driven member. Said sprocket wheel may be mounted for rotation on the shaft 3 in any desired way, and as herein shown it is rotatably mounted upon a sleeve 4 which encircles and is fast to the shaft 3, suitable roller bearings 5 being interposed between the sprocket wheel and the sleeve in order to reduce friction.

The sleeve 4 is formed at one end with a head or collar member 6, and in the construction shown said sleeve and collar member are made fast to the shaft 3 through the medium of a set screw 7 which is mounted in the collar 6.

The collar 6 has a radial friction face 8 which engages the side face 9 of the hub of the sprocket wheel.

Mounted on the shaft 3 is a second collar 10 which is splined to the shaft and hence is movable slightly in an axial direction but is locked to the shaft for rotation therewith. The second collar 10 bears against the other side face 11 of the sprocket wheel 1.

Means are provided for applying pressure in an axial direction against the collar 10 so as to provide a frictional driving or torque-transmitting action between the faces 9 and 11 of the driving member 1 and the collars 10 and 6. It will be obvious that the amount of torque transmitted from the driving member 1 to the driven member 3 will depend upon the pressure of the collars 10 and 6 against the opposite side faces 11 and 9 of the driving member 1.

If desired, the driving member may be provided with friction rings 12, 13 which engage the collars 10 and 6 and thereby increase the friction driving effect.

For varying the pressure of the collars 10 and 6 against the friction elements 12, 13 there is provided a third collar 14 which is locked to the shaft 3 by means of a set screw 15 and which is spaced from the second collar 10.

Situated between the collars 10 and 14 is a non-rotatable member 16 through which the shaft 3 extends and which is provided with an annular fluid-receiving chamber 17 having two opposed radially extending side walls 28 and 18, the side wall 18 being a flexible wall. A thrust ball bearing 19 is located between the member 16 and the collar 10. The flexible wall 18 of the chamber 17 bears against a thrust collar 20 and a thrust ball bearing 21 is located between the thrust collar 20 and the third collar 14. Means are provided for introducing and maintaining fluid (either air, oil, or water) under pressure in the chamber 17 and for this purpose said chamber 17 is provided with a port 22 which communicates with a supply pipe 23 through which the fluid may be admitted to the chamber 17 and maintained therein under pressure.

In the construction shown in Fig. 1 the flexible side wall 18 of the chamber 17 is constituted by a flat ring-like diaphragm member 24 of flexible material, the outer peripheral portion of which is clamped to the member 16 by a clamping ring 35 which is secured to said member by clamping screws 36. The inner edge portion 25 of the flexible diaphragm member 24 is free and overlies and rests against the inclined diaphragm-supporting face 26 of an annular lip or rib 27 with which the member 16 is provided. While the inner free edge portion 25 of the member 24 is not attached to the rib 27, yet the pressure of the fluid within the chamber 17 will hold said edge portion 25 against the inclined face 26 with sufficient force to prevent leakage at this point.

The operation of the device will be evident from the above description. When the chamber 17 is filled with fluid under pressure such fluid will exert a pressure against the solid wall 28 of the chamber 17 in a direction toward the left and will exert a similar pressure against the flexible wall portion 18 in a direction toward the right. The pressure thus exerted is transmitted through the ball bearings 19 and 21 to the third collar 14 which is fixed on the shaft 3 and to the second collar 10 which is splined to shaft and thereby a driving frictional engagement or torque transmission will be established between the side faces 11 and 9 of the driving member 1 and the collars 10 and 6. The extent or degree of the torque transmission will, of course, depend upon the pressure in the chamber 17. If the pressure is increased there will be an increased torque transmission between the driving member and the shaft 3, while if the pressure is reduced the torque transmission will be correspondingly reduced.

In Fig. 5 there is shown a different embodiment of the invention wherein the flexible wall of the chamber 17 is constituted by an annular member 18a, the inner edge 25a of which rests against the inclined face 26 of the rib 27, as in Fig. 1, and the outside peripheral edge 30 of which rests against an inclined surface 31 of a second annular rib 32 with which the member 16a is provided.

The member 18a spans the annular opening between the lips 27 and 32 and thus constitutes the flexible side wall of the chamber 17. Said member 18a rests against a thrust collar 20, as in Fig. 1, and a thrust ball bearing 21 is located between the thrust collar 20 and the collar 14. In the device shown in Fig. 3 a thrust ball bearing 19 is interposed between the member 16a and the collar 10, the same as in Fig. 1.

As applied to a cloth feeding machine the shaft 3 may be connected in some suitable way to a feed roller over which the cloth passes and by which it is fed forward and suitable means, such as a well-known dancer roll, which rests on the cloth and has a vertical movement as the tension on the cloth varies may be connected to a suitable valve device associated with the pipe 23 by which the pressure in the chamber 17 may be varied as the tension on the cloth varies.

It will be understood, however, that the device is not limited to use in connection with cloth feeding means, but is capable of use in connection with a wide variety of different machines where it is desirable to control and vary the torque transmitted from a driving member to a driven member.

I claim:

1. In a means for applying axial thrust to an annular element encircling a shaft, the combination with said shaft and annular element, of a non-rotatable member encircling the said shaft and having an interior annular fluid-receiving chamber, said chamber having two opposed radially extending walls, one of which is in the form of an annular flexible diaphragm which is in engagement with said annular element and which has a free inner edge portion, said non-rotatable member having an annular diaphragm-supporting surface against which the outer face of said free edge portion of the diaphragm rests, and means to deliver fluid under pressure to said chamber, thereby to subject said diaphragm to pressure in an axial direction which is transmitted to said annular element and also to press the free edge portion of said diaphragm into leakproof engagement with the annular diaphragm supporting surface.

2. In a device of the class described the combination with a shaft and an annular element encircling it, of a non-rotatable member encircling said shaft and having an annular chamber in one side face thereof, a flexible annular diaphragm closing said chamber and forming one wall thereof, means clamping the outer peripheral portion of said diaphragm to said annular member, the inner edge portion of the diaphragm being free, said annular member having an annular diaphragm-supporting surface against which the upper face of the free inner edge portion of the diaphragm rests, and means to deliver fluid under pressure to said chamber thereby to subject said diaphragm to pressure in an axial direction which is transmitted to said annular element and also to press the free edge portion of said diaphragm into leak-proof engagement with the annular diaphragm-supporting surface.

References Cited in the file of this patent

UNITED STATES PATENTS

| | | |
|---|---|---|
| 1,758,370 | Olsen et al. | May 13, 1930 |
| 2,495,869 | Schroeder | Jan. 31, 1950 |
| 2,587,230 | Schaad | Feb. 26, 1952 |

FOREIGN PATENTS

| | | |
|---|---|---|
| 21,915 | Germany | Apr. 26, 1883 |